US012429836B2

(12) United States Patent
Richter et al.

(10) Patent No.: US 12,429,836 B2
(45) Date of Patent: Sep. 30, 2025

(54) METHOD FOR GENERATING A STATE MODEL DESCRIBING A CONTROLLABLE SYSTEM

(71) Applicant: Robert Bosch GmbH, Stuttgart (DE)

(72) Inventors: Felix Milo Richter, Tettnang (DE); Joel Oren, Tel Aviv (IL)

(73) Assignee: ROBERT BOSCH GMBH, Stuttgart (DE)

( * ) Notice: Subject to any disclaimer, the term of this patent is extended or adjusted under 35 U.S.C. 154(b) by 410 days.

(21) Appl. No.: 18/047,011

(22) Filed: Oct. 17, 2022

(65) Prior Publication Data

US 2023/0130032 A1  Apr. 27, 2023

(30) Foreign Application Priority Data

Oct. 25, 2021 (DE) ...................... 10 2021 212 008.3

(51) Int. Cl.
*G05B 15/02* (2006.01)
(52) U.S. Cl.
CPC .................... *G05B 15/02* (2013.01)
(58) Field of Classification Search
CPC ....... G05B 15/02; G05B 17/02; G05B 13/042
See application file for complete search history.

(56) References Cited

U.S. PATENT DOCUMENTS

| | | | | |
|---|---|---|---|---|
| 9,047,423 | B2 * | 6/2015 | Tesauro | G06N 7/01 |
| 11,514,271 | B2 * | 11/2022 | Zhai | G06F 16/9035 |
| 11,514,305 | B1 * | 11/2022 | Commons | G06N 3/08 |
| 11,755,923 | B2 * | 9/2023 | Sohrabi Araghi | G06N 5/045 |
| | | | | 706/46 |
| 11,887,035 | B2 * | 1/2024 | R | G06Q 10/08 |
| 11,897,140 | B2 * | 2/2024 | Wandzel | B25J 9/1661 |
| 11,948,560 | B1 * | 4/2024 | Coursey | G10L 15/1815 |
| 12,143,931 | B2 * | 11/2024 | Dixit | H02J 3/381 |
| 2009/0306866 | A1 * | 12/2009 | Malikopoulos | B60W 30/1882 |
| | | | | 701/59 |
| 2011/0059427 | A1 * | 3/2011 | Hans | G05B 13/0265 |
| | | | | 434/322 |
| 2013/0185039 | A1 * | 7/2013 | Tesauro | G06Q 10/063 |
| | | | | 703/6 |
| 2019/0079472 | A1 * | 3/2019 | Hou | G05B 9/02 |
| 2020/0273079 | A1 * | 8/2020 | Raviv | G06Q 30/0631 |

(Continued)

FOREIGN PATENT DOCUMENTS

DE 102006059829 A1 6/2008

*Primary Examiner* — Mohammad Ali
(74) *Attorney, Agent, or Firm* — NORTON ROSE FULBRIGHT US LLP (57) ABSTRACT

A method for generating a state model describing a controllable system. The method includes: providing at least one part of the state model; selecting an action from a set of actions starting from the second state of the components; simulating further states of the components by a successive application of an action from the set of actions to the components in each case, an individual reward being determined for each of the applications of an action to the components; optimizing the at least one part of the state model based on the determined rewards, the optimizing of the at least one part of the state model taking place based on a variance reduction method and a maximum of the determined rewards; and adding the selected action and the second state to the at least one part of the state model.

13 Claims, 2 Drawing Sheets

(56) References Cited

U.S. PATENT DOCUMENTS

| | | | |
|---|---|---|---|
| 2022/0108262 A1* | 4/2022 | Cella | G01N 29/14 |
| 2022/0198225 A1* | 6/2022 | Choi | G06N 3/08 |
| 2022/0361100 A1* | 11/2022 | Dixit | H04W 52/0206 |
| 2022/0366246 A1* | 11/2022 | Danihelka | G06N 3/08 |
| 2023/0074995 A1* | 3/2023 | Lee | H02J 3/50 |
| 2023/0101250 A1* | 3/2023 | Kosman | G06V 10/82 |
| | | | 382/156 |
| 2023/0130032 A1* | 4/2023 | Richter | G05B 17/02 |
| | | | 700/28 |

* cited by examiner

Fig. 1

METHOD FOR GENERATING A STATE MODEL DESCRIBING A CONTROLLABLE SYSTEM

CROSS REFERENCE

The present application claims the benefit under 35 U.S.C. § 119 of German Patent No. DE 10 2021 212 008.3 filed on Oct. 25, 2021, which is expressly incorporated herein by reference in its entirety.

FIELD

The present invention relates to a method for generating a state model describing a controllable system, a method for selecting an action to be applied to the components of the controllable system based on the generated state model, and to a method for controlling the controllable system based on the selected action.

BACKGROUND INFORMATION

A controllable system is understood as a system that can be controlled in such a way that a state of the system or of one or more components of the system is able to be transferred into a new state within a finite time, in particular from a selected input state to a selected output state, by applying suitable actuation signals or by applying tasks or actions.

Moreover, a model of a behavior of the controllable system, made up of states, state transitions and actions, is understood as a state model or a system description of the controllable system. The states, for instance, may pertain to the nature of one or more components of the controllable system or to other information characterizing the state of the components such as information about a capacity utilization of one or more components of the controllable system. For example, the actions may furthermore involve functions that can be executed by the controllable system or involve tasks for controlling the controllable system, and the state transitions symbolize the change in the state of components of the controllable system after one of the actions has been applied to the components.

Among other things, such a state model is used to learn or symbolize the behavior of a controllable system when an action is applied starting from a specific state of the components of the controllable system, whereupon, based on the state model, one or more actions is/are able to be selected with the goal of achieving a selected state.

However, it may be difficult to select the actions that must be carried out in order to produce a selected or desired state. For example, the desired state may often be achieved by different combinations of actions. The situation may also arise in which further tasks or actions to be processed by the components may additionally arise while the allocation of actions to components of the controllable system is implemented.

Conventional methods attempt to solve the corresponding allocation problem based on autodidactic learning methods such as the Monte Carlo simulation methods.

Such simulation methods have the advantage that the behavior of the controllable system or the state model can be learned without the specification of rules. However, a disadvantage of such methods is that they have a degree of uncertainty, in particular because the realizations obtained during the application of the learning method depend on certain random conditions, e.g., currently existing conditions. As a result, there is a demand for better methods for generating such a state model.

U.S. Pat. No. 9,047,423 B2 describes a method for selecting actions in a scheduling problem state, in which—starting from the current state of the scheduling problem—one or more action sequences, state transitions and rewards is/are symbolized. During the simulation of the execution of a given action in a given state, a dataset is recorded which includes observed, context-related state information and an observed cumulative reward that results from the action. In addition, a regression adaptation is performed on the datasets, which enables an estimation of the expected reward as a function of the contextual state. The estimations of the expected rewards are used to guide the selection of the actions during the simulation. After all simulations have been concluded, the action of the uppermost level that has achieved the highest average reward during the simulations is able to be executed in the current state of the scheduling problem.

SUMMARY

An object of the present invention is to provide an improved method for generating a state model describing a controllable system.

This object may be achieved by a method for generating a state model describing a controllable system, according to the present invention.

In addition, the object may be achieved by a control device for generating a state model describing a controllable system having the features of the present invention.

The object may also be achieved by a computer program and a computer-readable data carrier, having the features of the present invention.

According to one example embodiment of the present invention, this object is achieved by a method for generating a state model describing a controllable system, in which information is provided about correlations between states of components of the controllable system and actions influencing the states of the components of the controllable system, the information forming at least one part of the state model; an action is selected from a set of actions influencing the state of the components of the controllable system; the selected action is applied to the components of the controllable system, the components of the controllable system being in a first state prior to the application of the selected action and in a second state following the application of the selected action; and starting from the second state of the components of the controllable system, further states of the components of the controllable system are simulated, the simulating of further states involving a successive application of an action from the set of actions influencing the state of the components of the controllable system in each case; and a reward is determined for each application of an action to the components of the controllable system; the at least one part of the state model is optimized based on the determined rewards; the selected action and the second state are added to the at least one part of the state model; and the optimizing of the at least one part of the state model is carried out based on a variance reduction method and a maximum of the determined rewards.

In this context, a controllable system is understood as a system which is able to be controlled in such a way that a state of the system or of one or more components of the system is transferrable into a new state within a finite time, in particular from a selected input state into a selected output state, by applying suitable actuation signals or by applying suitable tasks or actions. Components of the controllable system are to be understood as individual controllable components or actuators or machines that make up the system. For instance, the controllable system may be a production system for producing components such as semiconductor wafers, the system being made up of individual production machines. However, the controllable system may also be a data transmission system in which the individual components of the system represent communication participants such as clients or servers.

A state of the components of the controllable system is furthermore understood as the precise configuration of the components of the controllable system at a specific point in time.

Moreover, actions that influence the state of the components of the controllable system are understood as actions whose application may lead to a change in or an effect on the state of the components of the controllable system.

In addition, the reward pertains to a numerical value, which is transmitted by the controllable system to a corresponding artificial intelligence or an agent immediately following each selected action or selected task, and which symbolizes the corresponding chances of success of the execution of the action on a given underlying problem.

For instance, if the state of the components of the controllable system improves after the action, then the sum of the rewards increases. If the state has worsened, then a deduction is made as a penalty.

A variance reduction method particularly pertains to a method for increasing the efficiency of the generation of the state model, the accuracy of the estimation or simulation of the state model being increased, and the corresponding variance in the estimation preferably being reduced or minimized.

According to an example embodiment of the present invention, a method is therefore provided which is designed to learn the behavior of the controllable system in an autodidactic manner or to generate the state model in an autodidactic manner, in particular based on a Monte Carlo simulation method such as the Monte Carlo tree search. By applying the variance reduction method, the accuracy of the generation of the state model is able to be increased. In addition, the influence of chance, that is, of rewards that are based on states that have come about simply by chance during the generation of the state model, is able to be reduced when generating the state space because control random variates are used as well. As a whole, a better method for generating a state model describing a controllable system is therefore made available.

The method may be executed repeatedly, for instance until the state model covers all possible combinations of actions and states of the components of the controllable system or until the state model covers a certain number of nodes or consecutive actions in each case.

According to an example embodiment of the present invention, the provided information about correlations between states of components of the controllable system and the actions influencing the states of the components of the controllable system may furthermore involve parts of the state model obtained during previous applications of the method. However, the information may also be obtained by acquiring states of the components of the controllable system after the application of actions from the set of actions influencing the state of the components of the controllable system, for instance.

The generated state space may subsequently be utilized to plan a technical process to be carried out by the controllable system, e.g., to select an optimal process from processes that are executable by the controllable system, for instance to develop and produce the controllable system itself.

In addition, the present method may include a step of detecting the second state of the components of the controllable system. Thus, in particular conditions outside the data processing system on which the generation of the state model is carried out may be acquired, and the generation of the state model be based on these conditions.

In one example embodiment of the present invention, the optimizing of the at least one part of the state space based on a variance reduction method and a maximum of the determined chances of success furthermore include an optimization of the at least one part of the state space based on a control variate and the maximum of the determined chances of success.

Control variates or interference variables are generally understood as parameters which are additionally incorporated as predictors or independent variables into a statistical model with the goal of avoiding interference effects. In general, control variates denote features that influence a dependent variable to be optimized or that are correlated therewith and whose behavior or expected value is known. For instance, if the controllable system involves a production system for the production of components such as semiconductor wafers, which is made up of individual production machines, and individual workpieces are meant to be distributed to the production machines in order to achieve the highest possible capacity utilization of the machines, then the control variate may indicate how many more workpieces are added after the production has already started, a correlation between the capacity utilization of the production machines and the number of newly added workpieces being known.

Thus, the accuracy of the estimation or simulation of the state model is able to be further increased in a simple and effective manner and the corresponding variance in the estimation be reduced.

A further example embodiment of the present invention also provides a method for selecting an action to be applied to components of the controllable system from a set of actions influencing the state of the components of the controllable system, a state model describing the controllable system being generated by an afore-described method for generating a state model describing a controllable system, and an action to be applied to the components of the controllable system is selected from the set of actions influencing the state of the components of the controllable system based on the state model describing the controllable system and a current state of the component of the controllable system.

An action to be applied to components of the controllable system is understood as an action that should preferably be applied to the components of the controllable system based on the state model in order to produce a selected or predefined, preferably optimal state. For example, the action may include a distribution of the workpieces to the individual machines of a production system in such a way that the most optimal capacity utilization of the production system results.

In addition, however, the action also makes it possible to distribute bandwidths and/or data packets to individual channels or links in a communications system such that compliance with provider stipulations is possible or the most optimal capacity utilization of the channels of the communications system is achieved.

Overall, according to an example embodiment of the present invention, a method is provided for selecting an action to be applied to components of the controllable system from a set of actions influencing the state of the components of the controllable system, which is based on an improved method for generating a state model describing a controllable system. More specifically, the method is based on a method for generating a state model describing a controllable system which is designed to learn the behavior of the controllable system in an autodidactic manner or to generate the state model in an autodidactic manner, in particular based on a Monte Carlo simulation method such as the Monte Carlo tree search.

By applying the variance reduction method, the accuracy of the generation of the state model is able to be increased. In addition, the influence of chance, i.e., of rewards that are based on states that have come about simply by chance during the generation of the state space, can be reduced when generating the state model because control variates are used as well.

The present method may also include a step of acquiring the current state of the components of the controllable system. Current conditions, in particular current conditions outside the data processing system on which the method is carried out, can be acquired and the method for selecting an action to be applied to components of a controllable system from a set of actions influencing the state of the components of the controllable system be based on these current conditions.

A further example embodiment of the present invention also provides a method for controlling components of a controllable system, and an action to be applied to the components of the controllable system is selected by an afore-described method for selecting an action to be applied to components of a controllable system from a set of actions influencing the state of the components of the controllable system, and the selected action is applied to the components of the controllable system.

Overall, according to an example embodiment of the present invention, a method for controlling of components of a controllable system is therefore provided, which is based on an improved method for generating a state model describing a controllable system. In particular, the method is based on a method for generating a state model describing a controllable system, which is designed to learn the behavior of the controllable system in an autodidactic manner or to generate the state model in an autodidactic manner, in particular based on a Monte Carlo simulation method such as the Monte Carlo tree search. By applying the variance reduction method, the accuracy of the generation of the state model can be increased. In addition, the influence of chance, i.e., of rewards that are based on states that have occurred simply by chance during the generation of the state space, can be reduced when generating the state space because control variates are used as well.

Moreover, a further example embodiment of the present invention also provides a control device for generating a state model describing a controllable system, the control device having a receiver unit for receiving information about to the correlations between states of components of the controllable system and actions influencing the states of the components of the controllable system, the information forming at least one part of the state model; a selection unit, which is designed to select an action from a set of actions influencing the state of the components of the controllable system; an application unit, which is designed to apply the selected action to the components of the controllable system, the components of the controllable system being in a first state prior to the application of the selected action and in a second state following the application of the selected action; a simulation unit, which is designed to simulate further states of the components of the controllable system starting from the second state of the components of the controllable system, the simulating of further states including a successive application of an action from the set of actions influencing the state of the components of the controllable systems to the components of the controllable system; a reward is determined for each of the applications of an action to the components of the controllable system; an optimization unit, which is designed to optimize at least one part of the state model based on the determined rewards; and an addition model, which is designed to add the selected action and the second state to the at least one part of the state model, the optimization unit being designed to optimize the at least one part of the state model based on a variance reduction method and a maximum of the determined rewards.

According to an example embodiment of the present invention, a control device is therefore provided which is designed to learn the behavior of the controllable system in an autodidactic manner or to generate the state model in an autodidactic manner, in particular based on a Monte Carlo simulation method such as the Monte Carlo tree search. By applying the variance reduction method, the accuracy of the generation of the state model is able to be increased. Furthermore, the influence of chance, that is, of rewards that are based on the states that have come about simply by chance during the generation of the state model, can be reduced when generating the state space because control variates are used as well. Overall, an improved control device for generating a state model describing a controllable system is therefore provided.

The control device may furthermore have a detector, which is designed to detect the second state of the components of the controllable system. In particular, conditions outside the data processing system on which the generation of the state model is carried out are able to be acquired and the generation of the state model be based on these conditions.

In one example embodiment of the present invention, the optimization unit is furthermore developed to optimize the at least one part of the state model based on a control variate and the maximum of the determined rewards. This makes it possible to increase the accuracy of the estimation or simulation of the state model in a simple and effective manner and to reduce the corresponding variance in the estimation.

In addition, a further example embodiment of the present invention also provides a control device for selecting an action to be applied to components of a controllable system from a set of actions influencing the state of the components of the controllable system, the control device including a receiver unit for receiving a state model generated by an afore-described control device for generating a state model describing a controllable system, and a selection unit, which is designed to select an action to be applied to the components of the controllable system from the set of actions influencing the state of the components of the controllable system, based on the state model describing the controllable system and a current state of the components of the controllable system.

Overall, according to an example embodiment of the present invention, a control device is therefore provided for selecting an action to be applied to components of a controllable system from a set of actions influencing the state of the components of the controllable system, which is based on an improved control device for generating a state model describing a controllable system. In particular, the control device is based on a control device for generating a state model describing a controllable system, which is designed to learn the behavior of the controllable system in an autodidactic manner or to generate the state model in an autodidactic manner, in particular based on a Monte Carlo simulation method such as the Monte Carlo tree search.

By applying the variance reduction method, the accuracy of the generation of the state model is able to be increased. Furthermore, the influence of chance, that is, of rewards that are based on states that have come about simply by chance during the generation of the state model, is able to be reduced when generating the state model because control variates are applied as well.

The control device may furthermore include an acquisition unit, which is designed to acquire the current state of the components of the controllable system. Current conditions, in particular current conditions outside the data processing system on which the selection of the action is carried out, are thus able to be acquired and the selection of an action from a set of actions influencing the state of the components of the controllable system to be applied to components of a controllable system may be based on these current conditions.

A further example embodiment of the present invention provides a control device for controlling components of a controllable system, the control device having a receiver unit, which is designed to receive an action selected by a control device for selecting an action to be applied to components of a controllable system from a set of actions influencing the state of the components of the controllable system, and it provides an application unit, which is designed to apply the selected action to the components of the controllable system.

Overall, according to an example embodiment of the present invention, a control device for controlling components of a controllable system is therefore provided, which is based on an improved control device for generating a state model describing a controllable system. In particular, the control device is based on a control device for generating a state model describing a controllable system which is designed to learn the behavior of the controllable system in an autodidactic manner or to generate the state model in an autodidactic manner, in particular based on a Monte Carlo simulation method such as the Monte Carlo tree search. By applying the variance reduction method, the accuracy of the generation of the state model is able to be increased. In addition, the influence of chance, that is, of rewards based on states that have come about simply by chance during the generation of the state model, can be reduced when generating the state model because control variates are used as well.

Furthermore, another example embodiment of the present invention also provides a computer program which includes program code for executing an afore-described method for generating a state model describing a controllable system when the computer program is executed on a computer.

Another example embodiment of the present invention also provides a computer-readable data carrier having program code of a computer program for executing an afore-described method for generating a state model describing a controlled system when the computer program is executed on a computer.

The computer program as well as the computer-readable data carrier may have an advantage that they are designed to carry out a method by which the behavior of the controllable system is able to be learned in an autodidactic manner or the state model is able to be generated in an autodidactic manner, in particular based on a Monte Carlo simulation method such as the Monte Carlo tree search.

The application of the variance reduction method makes it possible to increase the accuracy of the generation of the state model. Moreover, the influence of chance, that is, of rewards based on states that have come about simply by chance during the generation of the state model, can also be reduced when generating the state model because control variates are applied as well.

In summary, it can be stated that the present invention provides an improved method for generating a state model describing a controllable system.

The described embodiments and refinements may be combined as desired.

Further possible embodiments, refinements and implementations of the present invention also include combinations of features of the present invention that are not explicitly described in the previous or the following text in connection with the exemplary embodiments.

BRIEF DESCRIPTION OF THE DRAWINGS

The figures are meant to give a better understanding of the embodiments of the present invention. They illustrate embodiments and provide an explanation of principles and concepts of the present invention in conjunction with the description.

Other embodiments and many of the mentioned advantages result in view of the figures. The illustrated elements of the figures are not necessarily represented true to scale in comparison with one another.

Unless otherwise indicated, identical reference numerals in the figures denote the same or functionally equivalent elements, parts or components.

DETAILED DESCRIPTION OF EXAMPLE EMBODIMENTS

Figure 1:
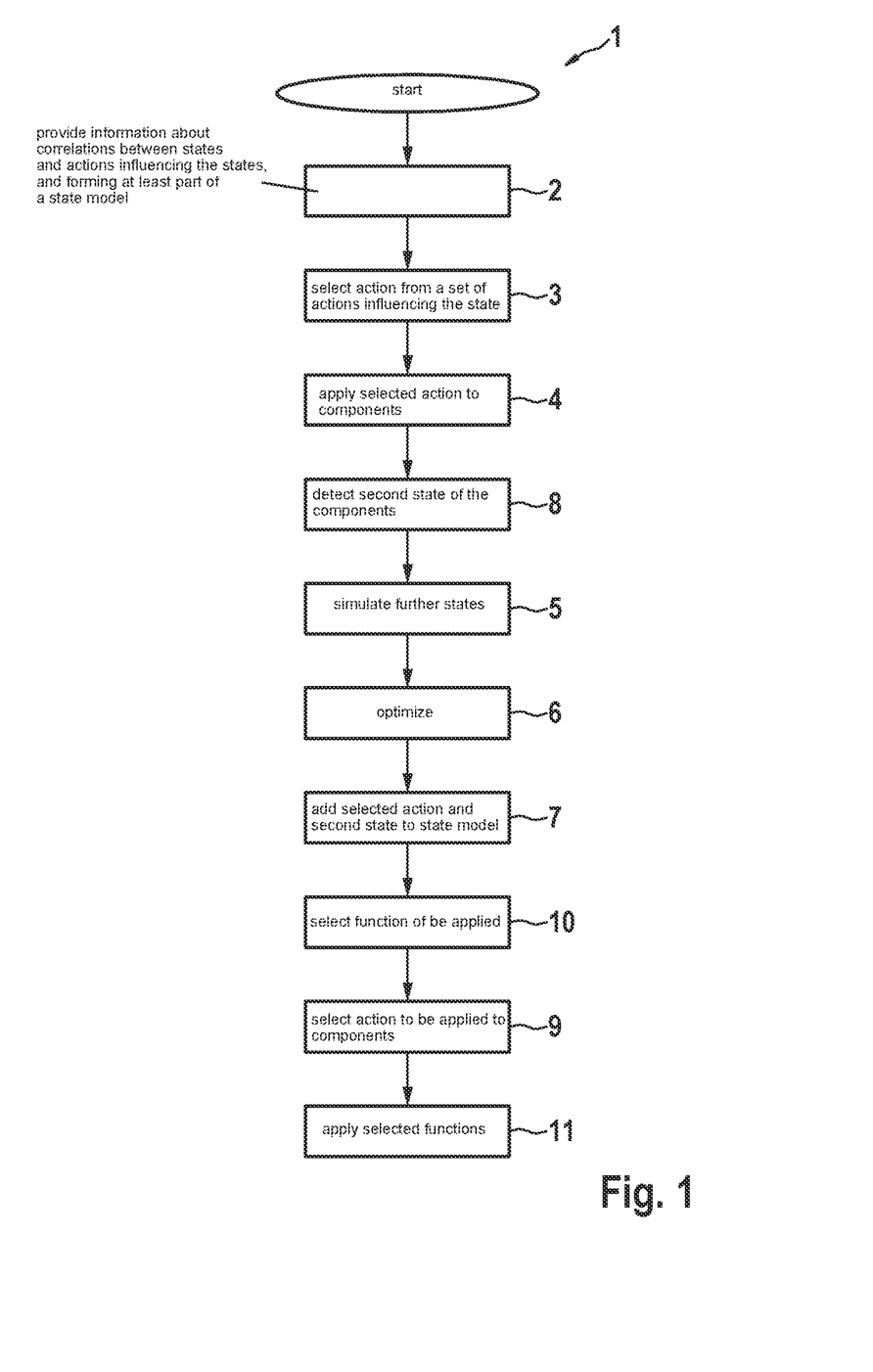
FIG. 1 shows a flow diagram of a method for controlling components of a controllable system according to embodiments of the present invention.

FIG. 1 shows a flow diagram of a method 1 for controlling components of a controllable system according to embodiments of the present invention.

The time-limited allocation of resources to processes or the corresponding set-up of a time schedule is generally referred to as scheduling. An optimal scheduling can result in significant time and cost savings during the implementation of industrial processes.

For instance, a state model of a corresponding controllable system is able to be set up based on the scheduling. A model of a behavior of the controllable system, made up of states, state transitions and actions, is denoted as a state model or a system description of the controllable system.

The states may pertain to the nature of one or more components of the controllable system or to other information that characterizes the state of the components, for instance information about a capacity utilization of one or more components of the controllable system. Moreover, the actions may involve functions that are able to be carried out by the controllable system or tasks for controlling the controllable system, the state transitions symbolizing the change in the state of components of the controllable system following the application of one of the actions to the components.

Among other things, such a state model is therefore used to learn or symbolize the behavior of a controllable system in the application of an action starting from a certain state of the components of the controllable system, and based on the state model, it is subsequently possible to select one or more actions with the goal of achieving a selected state. However, it may be difficult to select the actions that must be carried out so that a selected or desired state comes about. For instance, the desired state is often able to be achieved by different combinations of actions. In addition, situations may arise in which further tasks or actions come along that are to be implemented by the components while an allocation of actions to components of the controllable system is processed.

Methods are already available which attempt to solve the corresponding allocation problem based on autodidactic learning methods such as the Monte Carlo simulation method. Such simulation methods offer the advantage that the behavior of the controllable system or the state model can be learned without the definition of rules. However, such methods have the disadvantage that they include a degree of uncertainty, especially since the realizations obtained during the application of the learning method depend on certain random conditions such as currently prevailing conditions. As a result, there is a demand for improved methods for generating such a state model.

FIG. 1 shows a method 1 for generating a state model describing a controllable system, in which information about correlations between states of components of the controllable system and actions influencing the states of components of the controllable system is provided in step 2, the information forming at least one part of the state model; and in a step 3, an action is selected from a set of actions influencing the state of the components of the controllable system, the selected action is applied to components of the controllable system in a step 4, and the components of the controllable system are in a first state prior to the application of the selected action and in a second state following the application of the selected action; and starting from the second state of the components of the controllable system, further states of the components of the controllable system are simulated in a step 5, the simulating of further states including a successive application of an action from the set of actions influencing the state of the components of the controllable system, and a reward is determined for each application of an action to the components of the controllable system, the at least one part of the state model is optimized based on the determined rewards in a step 6, and the selected action and the second state are added to the at least one part of the state model in a step 7.

According to the embodiments of FIG. 1, the generation of the state model thus takes place based on an autodidactic learning method, in particular based on a Monte Carlo simulation method such as the Monte Carlo tree search.

In general, Monte Carlo denotes a class of algorithms which uses a random element to calculate an approximate result.

To generate the state model, an artificial intelligence or an agent may run through the known possibilities based on the known at least one part of the state model and subsequently may continue the run-through in a random fashion.

In this context, the next action is initially selected based on the current state. This adds a new node to the corresponding tree diagram or the at least one part of the state model, which is therefore expanded, this new node symbolizing the application of the selected action, and the application of the selected action transferring the components of the controllable system into a new state.

Starting from this new state, it is then simulated that further actions from a set of actions influencing the state of the components of the controllable system are applied to the components step by step or successively, the functions to be applied in each case in particular being randomly selected from the set of actions influencing the state of the components of the controllable system.

In the process, the consequence of the individual actions simulated during the simulation is observed and a corresponding reward is allocated to each of these actions. The reward is a numerical value which is transmitted by the controllable system immediately following each selected action and symbolizes the corresponding chances of success obtained by the execution of the respective action on an underlying problem. For example, if the state of the components of the controllable system improves following the action, then the sum of the rewards is increased. If the state worsens, then there will be a deduction as a penalty.

Based on the rewards, the at least one part of the state model, i.e., the edges of the tree diagram set up so far, is subsequently able to be optimized by applying a backpropagation method. A backpropagation method, in particular, which is functionally recursive, can be used for this purpose, the relevant statistics, e.g., the variance of the control variate and the covariance between the control variate and the reward, being aggregated recursively.

The present method may have an iterative design. In particular, the method is able to be carried out repeatedly, and the tree diagram, amended by a node and optimized during the previous repetition, being utilized during each repetition.

The method is able to be repeated until a meaningful state model of the controllable system has been obtained. Moreover, the number of repetitions or iterations may also be predefined.

According to the embodiments of FIG. 1, step 6 of optimizing the at least one part of the state model is based on the rewards obtained during simulation step 5, of the at least one part of the state model based on a variance reduction method and a maximum of the rewards determined in step 5, that is, the maximum value of all rewards determined in step 5.

As a result, a method is provided which is designed to learn the behavior of the controllable system in an autodidactic manner or to generate the state model in an autodidactic manner, in particular based on a Monte Carlo simulation method such as the Monte Carlo tree search. By applying the variance reduction method, the accuracy of the generation of the state model is able to be increased.

In addition, the influence of chance, that is, of rewards based on states that have come about simply by chance when the state space was generated, is able to be reduced during the generation of the state model since control variates are applied as well. Overall, an improved method for generating a state model describing a controllable system is therefore provided.

As also illustrated in FIG. 1, method 1 additionally includes a step 8 for detecting the second state of the components of the controllable system.

According to the embodiments of FIG. 1, step 6 of optimizing the at least one part of the state model based on a variance reduction method and a maximum of the determined rewards includes an optimization of the at least one part of the state model based on a control variate and the maximum of the determined rewards.

Insofar as the variance reduction method involves the application of a control variate, however, this constitutes only one possible embodiment. In fact, the variance can also be reduced by a corresponding weighting of the individual random samples or samples, for instance.

FIG. 1 furthermore shows a step 9 of selecting an action to be applied to the components of the controllable system from the set of actions influencing the state of the components of the controllable system based on the state model describing the controllable system and a current state of the component of the controllable system.

More specifically, after generating a corresponding state model, an action is able to be selected which, if possible, should be applied to the components of the controllable system based on the state model so that a selected or predefined, most optimal state comes about.

The selecting of the function to be applied takes place based on a current state of the components of the controllable system, the current state of the components of the controllable system being acquired or detected in a step 10.

In addition, FIG. 1 shows a step 11 of an application of the selected function to the components of the controllable system.

For example, the action may include the distribution of workpieces to the individual machines of a production system in such a way that the most optimal capacity utilization of the production system is achieved. In addition, however, the action may also result in a distribution of bandwidths and/or data packets to individual channels or links in a communications system such that compliance with provider specifications or the most optimal capacity utilization of the channels of the communications system is possible.

In addition, however, method 1 is also able to be used in other areas such as for the control of multiple elevators situated next to one another or for a traffic control system.

Figure 2:
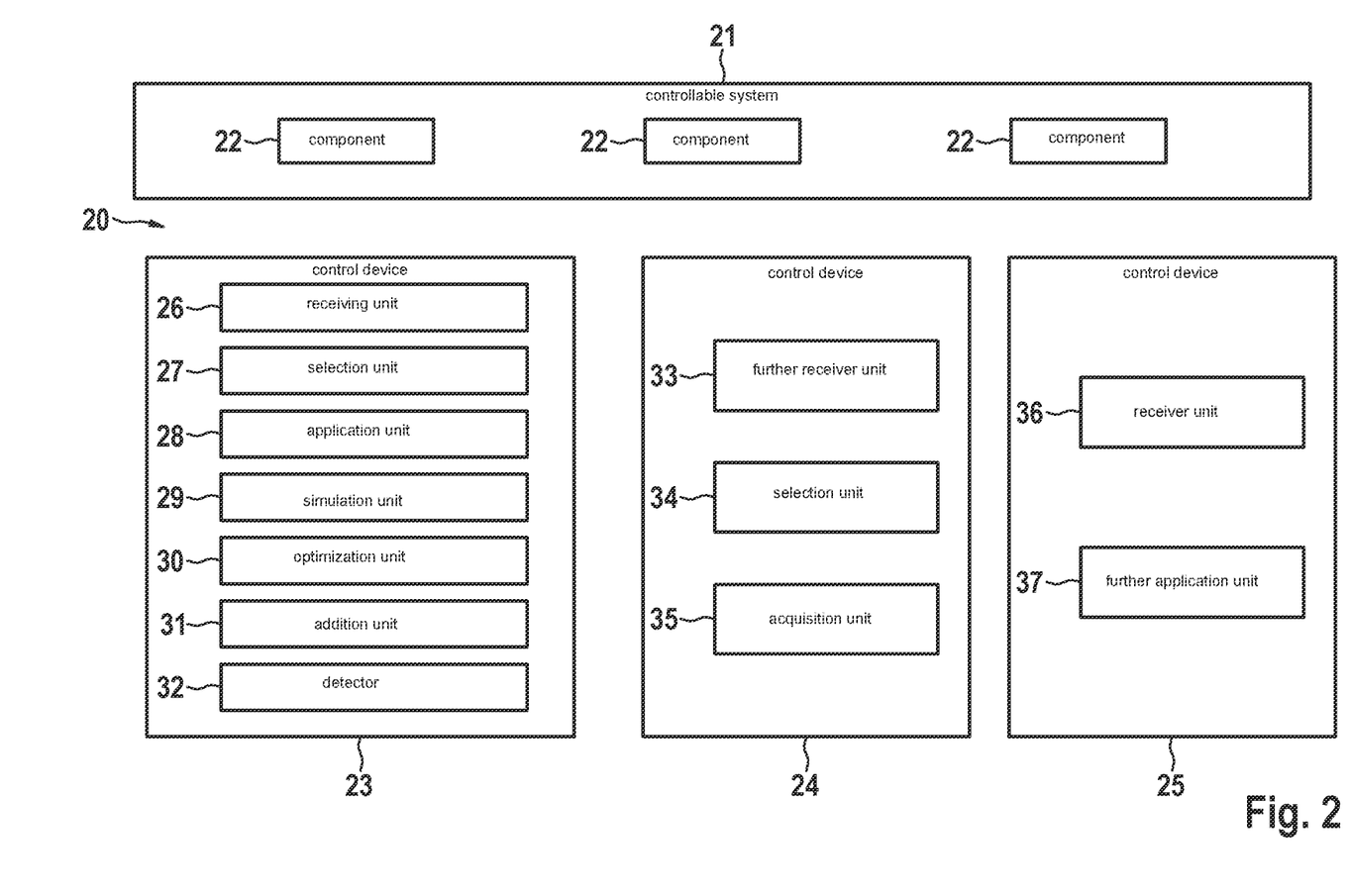
FIG. 2 shows a schematic block diagram of a system for controlling components of a controllable system according to embodiments of the present invention.

FIG. 2 shows a schematic block diagram of a system 20 for controlling components of a controllable system according to embodiments of the present invention.

FIG. 2 shows a controllable system 21 which has a plurality of components 22. According to the embodiments of FIG. 2, controllable system 21 is a production system, and the individual components 22 of the controllable system symbolize a production machine in each case.

As illustrated by FIG. 2, system 20 furthermore has a control device 23 for generating a state model describing the controllable system, a control device 24 for selecting an action to be applied to the components of the controllable system from a set of actions influencing the state of the components of the controllable system, and a control device 25 for controlling the components of the controllable system.

According to the embodiments of FIG. 2, control device 23 for generating a state model describing the controllable system has a receiver unit 26 for receiving information about correlations between states of components 22 of controllable system 21 and the actions influencing the states of the components of the controllable system, the information forming at least one part of the state model; a selection unit 27, which is designed to select an action from a set of actions influencing the state of the components of the controllable system; an application unit 28, which is designed to apply the selected action to components 22 of controllable system 21, components 22 of controllable system 21 being in a first state prior to the application of the selected action and in a second state after the application of the selected action; a simulation unit 28, which is designed to simulate further states of components 22 of controllable system 21 starting from the second state of the components of the controllable system, the simulating of further states including a successive application of an action from the set of actions influencing the state of the components of the controllable system to components 22 of controllable system 21, a reward being determining for each application of an action to components 22 of controllable system 21; an optimization unit 30, which is designed to optimize at least a part of the state model based on the determined rewards; and an addition unit 31, which is designed to add the selected action and the second state to the at least one part of the state model.

Optimization unit 30 is designed to optimize the at least one part of the state model based on a variance reduction model and a maximum of the determined rewards.

The receiver unit, for instance, may be a receiver which is designed to receive the information about correlations between states of the components of the controllable system and actions influencing the states of the components of the controllable system. Furthermore, the application unit may be a corresponding actuator, for instance. The selection unit, the simulation unit, the optimization unit, and the addition unit, for instance, may also be realized based on a code which is stored in a memory and is able to be executed by a processor in each case.

According to the embodiments of FIG. 2, control device 23 for generating a state model describing the controllable system furthermore includes a detector 32, in particular a sensor, which is designed to detect the second state of the components of the controllable system.

In addition, optimization unit 30 is designed to optimize the at least one part of the state model based on a control variate and the maximum of the determined rewards.

As also illustrated in FIG. 2, control device 24 for selecting an action to be applied to the components of the controllable system from the set of actions influencing the state of the components of the controllable systems has a further receiver unit 33 for receiving a state model describing a controllable system generated by control unit 23 for generating a state model describing the controllable system; and a selection unit 34, which is designed to select an action to be applied to the components of the controllable system from the set of actions influencing the state of the components of the controllable system, based on the state model describing the controllable system and a current state of the components of the controllable system.

The further receiver unit, for instance, may once again be a receiver which is designed to receive the corresponding information. In addition, the selection unit may once again be realized by a code which is stored in a memory and can be executed by a processor, for instance.

According to the embodiments of FIG. 2, control unit 24 for selecting an action to be applied to the components of the controllable system from the set of actions influencing the state of the components of the controllable system also has an acquisition unit 35, which is designed to acquire the current state of the components of the controllable system The selection unit may once again be a corresponding sensor, for instance.

As also illustrated by FIG. 2, control unit 25 for controlling components of the controllable system also has a further receiver unit 36, which is designed to receive an action selected by control device 24 for selecting an action to be applied to the components of the controllable system from a set of actions influencing the state of the components of the controllable system; and a further application unit 37, which is designed to apply the selected action to components 22 of controllable system 21.

The further receiver unit, for example, may once again be a receiver which is designed to receive the corresponding information. Moreover, the application unit may be an actuator which is designed to initiate the correspondingly selected action, for example.

What is claimed is:

1. A method for generating a state model describing a controllable system, the method comprising the following steps:
   providing information about correlations between states of components of the controllable system and actions influencing the states of the components of the controllable system, the information forming at least one part of the state model;
   selecting an action from a set of actions influencing the state of the components of the controllable system;
   applying the selected action to the components of the controllable system, the components of the controllable system being in a first state prior to the application of the selected action and in a second state following the application of the selected action;
   starting from the second state of the components of the controllable system, simulating further states of the components of the controllable system, the simulating of further states including a successive application of an action from the set of actions influencing the state of the controllable system to the components of the controllable system, and determining a reward for each application of an action to the components of the controllable system;
   optimizing the at least one part of the state model based on the determined rewards, the optimizing of the at least one part of the state model being carried out based on a variance reduction method and a maximum of the determined rewards; and
   adding the selected action and the second state to the at least one part of the state model.

2. The method as recited in claim 1, wherein the method furthermore comprises the following step:
   detecting the second state of the components of the controllable system.

3. The method as recited in claim 1, wherein the optimizing of the at least one part of the state model based on the variance reduction method and the maximum of the determined rewards includes optimizing the at least one part of the state model based on a control variate and the maximum of the determined rewards.

4. A method for selecting an action to be applied to components of a controllable system from a set of actions influencing the state of the components of the controllable system, the method comprising the following steps:
   generating a state method describing the controllable system by a method for generating a state model describing a controllable system including:
      providing information about correlations between states of components of the controllable system and actions influencing the states of the components of the controllable system, the information forming at least one part of the state model,
      selecting an action from a set of actions influencing the state of the components of the controllable system,
      applying the selected action to the components of the controllable system, the components of the controllable system being in a first state prior to the application of the selected action and in a second state following the application of the selected action,
      starting from the second state of the components of the controllable system, simulating further states of the components of the controllable system, the simulating of further states including a successive application of an action from the set of actions influencing the state of the controllable system to the components of the controllable system, and determining a reward for each application of an action to the components of the controllable system,
      optimizing the at least one part of the state model based on the determined rewards, the optimizing of the at least one part of the state model being carried out based on a variance reduction method and a maximum of the determined rewards, and
      adding the selected action and the second state to the at least one part of the state model; and
   selecting an action to be applied to the components of the controllable system from the set of actions influencing the state of the components of the controllable system based on the state model describing the controllable system and a current state of the components of the controllable system.

5. The method as recited in claim 4, wherein the method further comprises the following step:
   acquiring the current state of the components of the controllable system.

6. A method for controlling components of a controllable system, the method comprising the following steps:
   selecting an action to be applied to components of a controllable system from a set of actions influencing the state of the components of the controllable system, including:
      generating a state method describing the controllable system by a method for generating a state model describing a controllable system including:
         providing information about correlations between states of components of the controllable system and actions influencing the states of the components of the controllable system, the information forming at least one part of the state model,
         selecting an action from a set of actions influencing the state of the components of the controllable system,
         applying the selected action to the components of the controllable system, the components of the controllable system being in a first state prior to the application of the selected action and in a second state following the application of the selected action,
         starting from the second state of the components of the controllable system, simulating further states of the components of the controllable system, the simulating of further states including a successive application of an action from the set of actions influencing the state of the controllable system to the components of the controllable system, and determining a reward for each application of an action to the components of the controllable system,
         optimizing the at least one part of the state model based on the determined rewards, the optimizing of the at least one part of the state model being carried out based on a variance reduction method and a maximum of the determined rewards, and adding the selected action and the second state to the at least one part of the state model; and selecting an action to be applied to the components of the controllable system from the set of actions influencing the state of the components of the controllable system based on the state model describing the controllable system and a current state of the components of the controllable system; and applying the selected action to the components of the controllable system.

7. A control device for generating a state model describing a controllable system, the control device comprising:

a receiver unit configured to receive information about correlations between states of components of the controllable system and actions influencing the states of the components of the controllable system, the information forming at least one part of the state model;

a selection unit configured to select an action from a set of actions influencing the state of the components of the controllable system;

an application unit configured to apply the selected action to the components of the controllable system, the components of the controllable system being in a first state prior to the application of the selected action and in a second state following the application of the selected action;

a simulation unit configured to simulate further states of the components of the controllable system starting from the second state of the components of the controllable system, the simulating of further states including a successive application of an action from the set of actions influencing the state of the components of the controllable system to the components of the controllable system, and a reward is determined for each of the applications of an action to the components of the controllable system;

an optimization unit configured to optimize at least one part of the state model based on the determined rewards; and an addition unit configured to add the selected action and the second state to the at least one part of the state model, and the optimization unit being configured to optimize the at least one part of the state model based on a variance reduction method and a maximum of the determined rewards.

8. The control device as recited in claim 7, wherein the control device further includes a detector configured to detect the second state of the components of the controllable system.

9. The control device as recited in claim 7, wherein the optimization unit is configured to optimize the at least one part of the state model based on a control variate and the maximum of the determined rewards.

10. A control device for selecting an action to be applied to components of a controllable system from a set of actions influencing the state of the components of the controllable system, the control device comprising:

a receiver unit configured to receive a state model describing the controllable system and generated by a control device for generating a state model describing a controllable system, the control device for generating the state model description the controllable system including:

a receiver unit configured to receive information about correlations between states of components of the controllable system and actions influencing the states of the components of the controllable system, the information forming at least one part of the state model, a selection unit configured to select an action from a set of actions influencing the state of the components of the controllable system, an application unit configured to apply the selected action to the components of the controllable system, the components of the controllable system being in a first state prior to the application of the selected action and in a second state following the application of the selected action, a simulation unit configured to simulate further states of the components of the controllable system starting from the second state of the components of the controllable system, the simulating of further states including a successive application of an action from the set of actions influencing the state of the components of the controllable system to the components of the controllable system, and a reward is determined for each of the applications of an action to the components of the controllable system, an optimization unit configured to optimize at least one part of the state model based on the determined rewards, and an addition unit configured to add the selected action and the second state to the at least one part of the state model, and the optimization unit being configured to optimize the at least one part of the state model based on a variance reduction method and a maximum of the determined rewards; and a selection unit configured to select an action to be applied to the components of the controllable system from the set of actions influencing the state of the components of the controllable system, based on the state model describing the controllable system and a current state of the component of the controllable system.

11. The control device as recited in claim 10, wherein the control device further includes an acquisition unit configured to acquire the current state of the components of the controllable system.

12. A control device for controlling components of a controllable system, the control device comprising:

a receiver unit configured to receive an action selected by a control device for selecting an action to be applied to components of a controllable system from a set of actions influencing the state of the components of the controllable system, the control device for selecting an action including:

a receiver unit configured to receive a state model describing the controllable system and generated by a control device for generating a state model describing a controllable system, the control device for generating the state model description the controllable system including:

a receiver unit configured to receive information about correlations between states of components of the controllable system and actions influencing the states of the components of the controllable system, the information forming at least one part of the state model, a selection unit configured to select an action from a set of actions influencing the state of the components of the controllable system, an application unit configured to apply the selected action to the components of the controllable system, the components of the controllable system being in a first state prior to the application of the selected action and in a second state following the application of the selected action, a simulation unit configured to simulate further states of the components of the controllable system starting from the second state of the components of the controllable system, the simulating of further states including a successive application of an action from the set of actions influencing the state of the components of the controllable system to the components of the controllable system, and a reward is determined for each of the applications of an action to the components of the controllable system, an optimization unit configured to optimize at least one part of the state model based on the determined rewards, and an addition unit configured to add the selected action and the second state to the at least one part of the state model, and the optimization unit being configured to optimize the at least one part of the state model based on a variance reduction method and a maximum of the determined rewards; and a selection unit configured to select an action to be applied to the components of the controllable system from the set of actions influencing the state of the components of the controllable system, based on the state model describing the controllable system and a current state of the component of the controllable system; and an application unit configured to apply the selected action to the components of the controllable system.

13. A non-transitory computer-readable data carrier on which is stored program code of a computer program for generating a state model describing a controllable system, the program code, when executed by a computer, causing the computer to perform the following steps:

providing information about correlations between states of components of the controllable system and actions influencing the states of the components of the controllable system, the information forming at least one part of the state model;

selecting an action from a set of actions influencing the state of the components of the controllable system;

applying the selected action to the components of the controllable system, the components of the controllable system being in a first state prior to the application of the selected action and in a second state following the application of the selected action;

starting from the second state of the components of the controllable system, simulating further states of the components of the controllable system, the simulating of further states including a successive application of an action from the set of actions influencing the state of the controllable system to the components of the controllable system, and determining a reward for each application of an action to the components of the controllable system;

optimizing the at least one part of the state model based on the determined rewards, the optimizing of the at least one part of the state model being carried out based on a variance reduction method and a maximum of the determined rewards; and adding the selected action and the second state to the at least one part of the state model.

\* \* \* \* \*